June 7, 1938.   C. G. STRANDLUND   2,119,757
CLUTCH
Filed Jan. 27, 1937
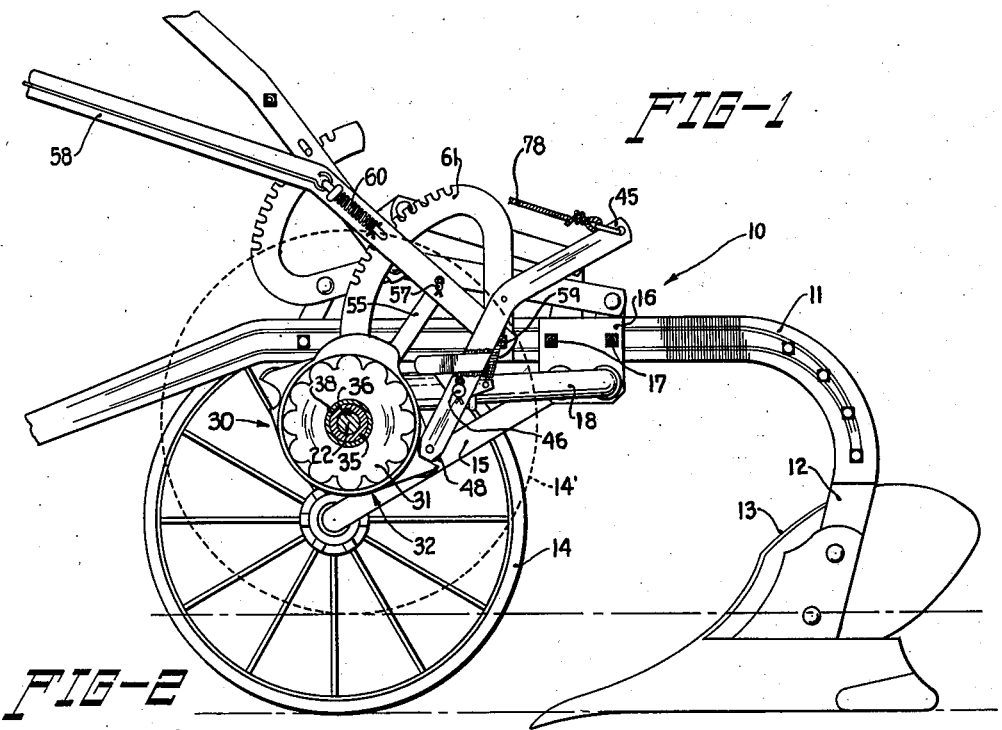
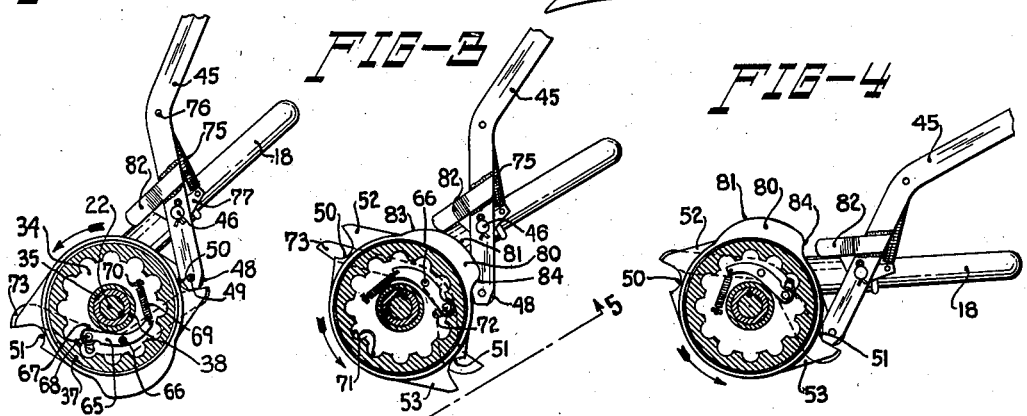
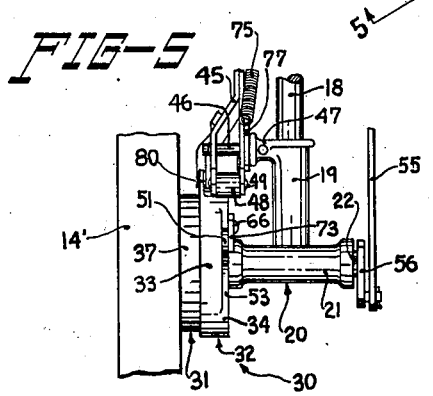
INVENTOR
CARL G. STRANDLUND
ATTORNEYS Patented June 7, 1938

2,119,757

UNITED STATES PATENT OFFICE 2,119,757

CLUTCH

Carl G. Strandlund, Moline, Ill., assignor to Deere & Company, Moline, Ill., a corporation of Illinois Application January 27, 1937, Serial No. 122,584

2 Claims. (Cl. 192—62)

This invention relates to clutches of the half revolution, self-interrupting type generally used on farm implements and the like for performing intermittent operations such as lifting the implement out of ground working position.

Clutches of this type are well known in the art and generally consist of a driving member connected to the wheel of the implement or other rotative part, and a driven member which is normally non-rotative but which can be connected to the driving member by means of a spring-actuated pawl pivoted on the driven member and adapted to engage the driving member. The driven member is normally locked against rotation by a trip lever having on its end a roller which engages a notch in the periphery of the driven member. In this position the roller also engages a dog which holds the pawl out of engagement with the driving member. To operate the lifting clutch, the trip lever is swung out of engagement against the pressure of the spring, thus releasing the driven member and allowing the pawl to connect the two members for concurrent rotation. After a movement of one-half revolution the roller on the trip lever drops into another notch on the opposite side of the driven member, thereby throwing the pawl once more out of engagement and locking the driven member against further rotation.

Satisfactory operation is assured providing that the operator promptly releases the tripping lever in time for its actuating spring to force the roller into the opposite notch. If, however, the tripping lever is not released in time for the roller to engage the notch, the clutch operates through another half revolution and returns the implement to its original position. Difficulty of this sort during the raising operation is seldom encountered because several seconds are required for the operation, giving sufficient time for the operator to release the lever. The conditions, however, during the lowering half of the cycle are different, making it much more difficult to obtain proper operation. When the operator swings the trip lever to lower an implement, the weight of the implement, especially in the case of a heavy tool such as a plow or lister, causes the driven member of the clutch to momentarily race ahead of the driving member as the implement falls to the ground, after which the driven member again engages the driving member, thus there is much less time allowed for the operator to release the tripping lever during the lowering cycle than there is during the raising cycle, which has sometimes resulted in the implement raising again after it was lowered, requiring another operation to place it in working position.

The object of my present invention is to provide simple and inexpensive but effective means for insuring that the tripping lever is released by the operator in time so that the clutch-engaging roller will drop into the notch in the clutch member. I accomplish this object by providing a camming means associated with the driven member of the clutch for engaging the trip lever during the half revolution of the driven member in which the implement is lowered. This camming means serves to force the trip lever back to its normal position in which it will engage the detent notch and thus if the operator does not release the tripping rope soon enough, it will be jerked free from his hand.

I will now describe the construction of a clutch embodying the principles of my invention and explain its operation, reference being had to the drawing appended hereto, in which Figure 1 is an elevation of a plow in lowered or ground working position with the land wheel removed to more clearly show the lifting clutch;

Figure 2 is an elevation, partly in section, of the clutch mechanism including the trip lever in the raised position of the plow;

Figure 3 is a view similar to Figure 2 but showing the position of the clutch mechanism during the lowering cycle of operation;

Figure 4 is also similar to Figure 2 but showing the mechanism in a lowered position of the plow; and Figure 5 is a fragmentary elevation as viewed along a line 5—5 in Figure 3.

Referring now to the drawing, the plow 10 comprises a generally fore and aft extending beam 11, the rear end of which terminates in a downwardly curving shank 12, to which is attached a plow share 13. The beam is supported on a furrow wheel 14 and a land wheel 14' (Figure 5) which is removed in Figure 1 for the purposes of this drawing but the position of which is indicated by a broken line. The furrow wheel 14 is journaled on a crank axle 15, which is swingably supported in a bearing plate 16 attached to the plow beam 11 by bolts 17. The land wheel is journaled on a crank axle 18, which is also swingably supported in bearing plate 16. The lower end of the land wheel crank axle 18 terminates in a socket portion 19 (see Figure 5) of a wheel-supporting casting 20. The casting 20 also includes a transversely extending socket portion 21, within which is journaled an axle 22.

The lifting clutch 30 comprises generally a driving member 31 fixed to the land wheel 14' and a normally non-rotative driven member 32. The driven member 32 comprises a housing having an outer cylindrical rim 33 formed integrally with a side plate 34. A hub 35 is attached to the side plate 34 concentric with the outer rim 33 and this hub is fixed on the axle 22 by a key 36. The driving member 31 comprises an annular portion 37, which extends inside of the rim 33 of the driven member 32 and includes a hub 38, which is journaled on the hub 35 of the driven member 32.

Normally the driving member 31 freely rotates on this journal bearing while the driven member 32 is prevented from rotating by a bifurcated trip lever 45, which is pivoted on a pin 46 supported in a boss 47, which is an integral part of the socket portion 19 of the casting 20. At the end of the trip lever 45, a detent roller 48 is journaled on a pin 49 supported between the two legs of the bifurcated lever. The roller 48 normally engages in one of two notches 50 and 51 formed in radially extending flanges 52 and 53, respectively, which extend outwardly from the periphery of the cylindrical portion 33 of the housing 32 in a plane with the side plate 34. In this normally non-rotative position of the clutch member 32, the crank axle 18 is fixed relative to the plow beam 11 by a link 55 pivotally connected to a crank 56 on the end of the axle 22 opposite to the lift clutch 30. The link 55 is connected by a pin 57 to a depth adjusting lever 58 pivoted to the plow beam on a bolt 59. The lever is held in fixed position by a latch 60, which engages a notched sector 61, which is also fixed to the plow beam 11.

The driving and driven members of the clutch are adapted to be connected together for concurrent rotation by means of a pawl 65 pivoted on a pivot pin 66 to the side wall 34 of the driven member 32. A clutch roller 67 is journaled on a pin 68 at one end of the pawl and at the opposite end of the pawl is attached a spring 69, which reacts against a lug 70 fixed to the wall 34 of the driven member, and yieldingly urges the pawl 65 to swing the clutch roller 67 outwardly into engagement with one of a number of notches 71 formed on the inner surface of the annular rim 37 of the driving member 31. The position of the pawl 65 is controlled by a throwout dog 73, which is fastened to the pawl by the clutch roller pin 68, which extends through a slot 72 in the side wall 34 of the driven member 32. The throwout dog 73 is pivoted on the outside of the wall 34 on the pivot pin 66 which is also the pivot pin for the pawl. Thus, by swinging the throwout dog 73 about its pivot 66, it moves the clutch pawl 65 through an equal angle. The two ends of the throwout dog 73 are disposed adjacent the detent notches 50 and 51 in the flanges 52 and 53, respectively. The ends of the throwout dog are disposed in such relation to the slots that when the detent roller 48 is disposed in one of the slots, it also engages the throwout dog and holds it in a position in which the clutch pawl 65 is held out of engagement with the driving member notches 71. When the trip lever 45 is swung to move the roller 48 out of the slot, the spring 69 pulls the pawl 65 into engagement with one of the notches 71, and in so doing moves the throwout dog into the position shown in Figure 3. The driving member 31 then operates through its connection with the pawl to drive the driven member concurrently as indicated in Figure 3.

The driven member, through the key 36, then rotates the axle 22 to swing the crank arm 56 through a half revolution which in turn, operating through the link 55 and the fixed lever 58, tends to raise or lower the plow beam 11 by swinging upon the crank axle 18. Since the two crank axles 15, 18 are interconnected by well-known linkage mechanism, which need not be described in detail here, both axles are swung simultaneously to maintain the plow substantially level as it raises or lowers. During the rotation of the driven member 32, the clutch roller 48 is adapted to roll on the outer periphery of the housing rim 33 and from there it rolls upon the edge of the flange 52 or 53, which provides a camming surface to guide the roller into one of the notches 50 or 51, as the case may be. The roller is held in engagement with the cylindrical housing portion 33 by means of a tension spring 75, which is connected between a pin 76 on the trip lever and an arm 77 which is fixed to the boss 47. The spring thus tends to swing the trip lever in clockwise direction as viewed in the drawing and thus holds the roller against the camming surfaces. However, as heretofore mentioned, if the operator retains his hold on the rope 78, which is attached to the tripping lever, until it is too late for the roller 48 to engage in the next detent notch, the clutch will remain engaged for another half revolution and the implement will return to its original position. In order to insure that the trip lever 45 returns to its normal position wherein the detent roller 48 rolls on the surface of the clutch housing 33, I have provided camming means for positively engaging the trip lever to move it into the desired position, thereby jerking the rope out of the operator's hand if necessary. This camming means comprises a flange 80 extending radially from the cylindrical portion 33 of the clutch member 32, but offset axially from the notched flanges 52, 53. As illustrated in Figure 5 the camming flange 80 is disposed adjacent the opposite edge of the rim portion 33. The edge 81 of the flange 80 provides a camming surface which engages a leg 82 welded or otherwise fixed to the side of the trip lever 45, on the opposite side of the pivot pin 46 from the detent roller 48. In Figure 3 this camming surface is shown in engagement with the leg 82, illustrating the manner in which the trip lever is forced by the camming action in a clockwise direction to move the roller 48 against its cooperative camming surface. Since the camming flange 80 is offset from the detent flanges 52 and 53, the detent roller 48 does not engage the camming surface 81 as it is disposed in register with the notched flanges 52 and 53. Similarly, the leg 82, being in register with the camming flange 80, does not engage the notched flanges, but merely passes them at one side.

As shown by the arrows in Figures 2, 3, and 4, the direction of rotation of the clutch is counterclockwise. The roller 48, having been released from the notch 50, is progressing toward the notch 51, which corresponds to the lowered position of the plow. The leading edge 83 of the camming surface 81 is disposed on a gradual slope so that the jerk on the rope 78 will not be any more sudden than is necessary. The trailing edge 84 of the cam surface 81, however, is cut off abruptly in order that the camming surface 81 may be effective as long as possible, but will not interfere with the trip lever when swinging the roller out of the notch 51. As shown in Figure 4, there is barely enough clearance between the leg 82 and the end or trailing surface 84 of the flange 80 to receive the leg 82 when the trip lever 45 is again operated.

I claim:

1. In a clutch of the class described, a rotatable driven member having means on the periphery thereof providing a camming surface including a detent notch, means providing a second peripheral camming surface offset axially on said member from said notched camming surface, and a separately supported detent member adapted to normally seat in said notch to hold said driven member against rotation, but movable out of said notch to permit rotation of said driven member, and means connected with said detent member adapted to follow said second camming surface during rotation of said member, for holding said detent member in engagement with said first camming surface to insure that said detent member is returned into position to seat in said notch.

2. In a clutch of the class described, a driven member including a cylindrical housing portion, a first flange extending radially outward from said cylindrical portion providing a camming surface including a pair of oppositely disposed detent notches, a second radially extending camming flange disposed on said cylindrical portion intermediate said notches and offset axially on said cylindrical portion from said first flange, and a trip lever having a roller disposed in register with said first flange and adapted to follow the camming surface thereon, another portion of the trip lever being adapted to engage said second camming flange for forcing said lever to a position holding the roller in engagement with said first flange, to insure that the roller seats in said detent notches.

CARL G. STRANDLUND.